United States Patent [19]

Huang et al.

[11] Patent Number: 5,233,652

[45] Date of Patent: Aug. 3, 1993

[54] SELECTIVE OFF-PREMISES JAMMING FOR PREMIUM CATV SERVICE

[75] Inventors: Zheng F. Huang, Ambler, Pa.; Jessica S. Wong, Ringwood, N.J.

[73] Assignee: AT&T Bell Laboratories, Murray Hill, N.J.

[21] Appl. No.: 888,302

[22] Filed: May 26, 1992

Related U.S. Application Data

[63] Continuation of Ser. No. 657,230, Feb. 19, 1991, abandoned.

[51] Int. Cl.$^5$ .................................... H04N 7/167
[52] U.S. Cl. .................................... 380/7; 380/8; 358/349
[58] Field of Search ................... 380/6, 7, 8; 455/26.1; 358/349

[56] References Cited

U.S. PATENT DOCUMENTS

| | | | |
|---|---|---|---|
| 3,989,887 | 11/1976 | Murphy | 380/7 X |
| 3,997,718 | 12/1976 | Ricketts et al. | 178/6.8 |
| 4,253,114 | 2/1981 | Tang et al. | 358/114 |
| 4,450,481 | 5/1984 | Dickinson | 358/114 |
| 4,521,809 | 6/1985 | Bingham et al. | 380/7 X |
| 4,580,161 | 4/1986 | Petrus et al. | 358/86 |
| 4,713,840 | 12/1987 | Hasegawa | 455/2 |
| 4,769,838 | 9/1988 | Hassegawa | 380/7 |
| 4,825,468 | 4/1989 | Ellis | 380/7 |
| 4,837,820 | 6/1989 | Bellavia, Jr. | 380/7 |
| 4,912,760 | 3/1990 | West, Jr. et al. | 380/7 |
| 5,027,399 | 6/1991 | Cordle et al. | 380/7 |
| 5,140,633 | 8/1992 | Gurusami et al. | 380/7 |

*Primary Examiner*—Tod Swann
*Attorney, Agent, or Firm*—R. B. Anderson

[57] ABSTRACT

Selective off-premises jamming for premium CATV service is provided by using continuously running fixed-frequency oscillators (19.1-19.n) for generating jamming signals at each of a plurality of distribution locations (13). The frequency of each oscillator corresponds to the frequency of one of the premium channels. A remotely controlled switched network is provided at each distribution location for applying jamming signals only to those TV channels of the subscriber lines (14) upon which the corresponding subscriber (15) is not entitled to receive premium signals. Since jamming signals are not applied to the TV channels upon which subscribers are entitled to receive premium TV programs, there is no need for de-scrambling apparatus at the various subscriber locations. In various embodiments, the switched network may be an array of switches (20.1-20.n), an array of filter traps (32.1-32.n) or an array of parallel connected band-pass filters (41.1-41.n).

14 Claims, 4 Drawing Sheets

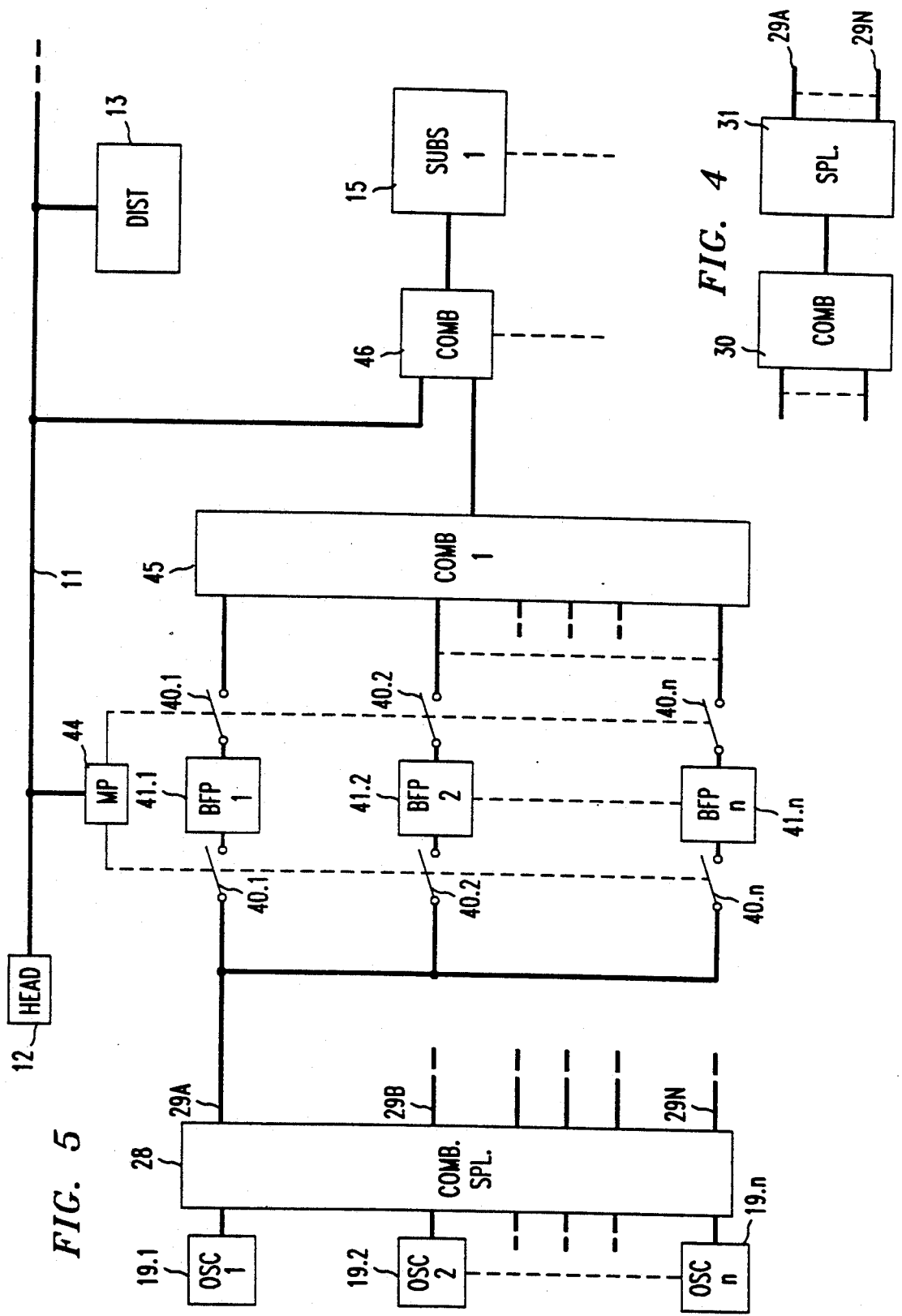

SELECTIVE OFF-PREMISES JAMMING FOR PREMIUM CATV SERVICE

This application is a continuation of application Ser. No. 07/657,230, filed on Feb. 19, 1991, now abandoned.

TECHNICAL FIELD

This invention relates to methods and apparatus for providing cable television (CATV) services and, more particularly, to methods and apparatus for providing premium CATV services to which only selected subscribers are entitled.

BACKGROUND OF THE INVENTION

CATV services are normally provided by transmitting a plurality of television (TV) programs from a head end of the system over television channels of a transmission line to a plurality of subscribers. It is known that such TV programs can be transmitted first to each of a plurality of distribution locations and from each distribution location over a plurality of subscriber lines to the subscribers. A converter at each subscriber location permits the subscriber to select whichever non-premium television channel the subscriber may want.

The provider may also transmit from the head end a plurality of jammed or scrambled TV programs over a plurality of premium TV channels. Those subscribers which, for an added fee, are permitted to receive premium channels, are provided with converters containing de-scramblers for permitting premium programs to be coherently received. In addition, pay-per-view (PPV) is a service sometimes provided to enable paying subscribers to watch a scheduled event at a particular time. This service may require, for example, that the subscriber communicate by telephone to the provider at the service office a request that he be permitted access to the scheduled event, whereupon the service provider remotely actuates a de-scrambler at the subscriber's location for permitting him to receive the scheduled event on a specified TV channel for a specified fee.

It has been recognized that these methods for providing premium service inherently suffer from several problems. First, the converters containing de-scramblers at each subscriber location are somewhat "user unfriendly"; i.e., such apparatus is sometimes difficult for the subscriber to operate. The converters are subject to tampering because they are located on subscriber premises. Another problem of a jamming system with jamming signals generated from the head end is the need for cascaded trap filters along the video signal path at each subscriber location. This results in degradation of the signal-to-noise ratio of many of the video channels. Also, transmission of the jamming signals tends to distort the premium TV signals.

Various techniques have been proposed for applying jamming signals at the distribution locations. This reduces the distortion of the premium signal by the jamming signals because the distance from the distribution locations to the subscriber locations is normally much smaller than the distance from the head end to the distribution locations, and there is typically a smaller number of active components.

Proposals have been made to add scrambling signals only to those TV channels of subscriber lines corresponding to premium signals which the individual subscribers are not entitled to receive. While such systems would eliminate all propagation of scrambling signals on premium video channels subscribers are entitled to receive, and would thereby eliminate the need for de-scramblers at the subscriber locations, they are difficult to operate reliably and they impose additional costs.

Thus, there has been a long-felt need for methods for delivering premium CATV services to selected subscribers, which methods are reliable, relatively inexpensive and easy to install and operate.

SUMMARY OF THE INVENTION

Premium CATV services are provided, in accordance with the invention, by using continuously running fixed-frequency oscillators for generating jamming signals at each of the distribution locations. The frequency of each oscillator corresponds to the frequency of one of the premium channels. A switched network, remotely controlled from the head end, is provided at each distribution location for applying jamming signals only to those TV channels of the subscriber lines upon which the corresponding subscriber is not entitled to receive premium signals. Since jamming signals are not applied to TV channels upon which subscribers are entitled to receive premium TV programs, there is no need for de-scrambling apparatus at the various subscriber locations. There is no problem of degradation or distortion of the premium signal by the scrambling signal, and so the frequency of the jamming signal may be close to that of the premium signal for maximum security. The switched networks are all remote from the subscriber's premises, and the switching is done in response to subscriber's requests and/or upon payment of appropriate fees.

In accordance with one embodiment, each oscillator is connected to a plurality of arrays of parallel connected switches, each switch of each array corresponding to one of the subscribers. A switch connected to an oscillator is closed if the corresponding subscriber is not entitled to receive the channel corresponding to such oscillator; if the subscriber is entitled to receive it, the switch is opened. The outputs of the switches for each subscriber are then combined for transmission on the appropriate subscriber line along with premium and non-premium video signals. The closed switches apply to the subscriber line jamming signals of the appropriate frequencies for jamming the channels to which the subscriber is not entitled, and leave the remaining channels free.

In another embodiment, a series array of filter traps are provided for each subscriber line. The outputs of all of the oscillators are then directed into each filter array, and switches bypassing selected filter traps are remotely controlled from the head end. In this manner, all of the jamming frequencies representing TV channels which the subscriber is entitled to receive are filtered out by the filter traps, while those filters corresponding to frequencies that are intended to jam premium channels are bypassed by way of the remotely controlled switches. The output of each array of filters thus gives a combined jamming signal that jams those channels the subscriber is not entitled to receive and permits unscrambled reception of premium signals on those channels to which the subscriber is entitled.

In still another embodiment, an array of parallel connected band-pass filters is provided for each subscriber. Each band-pass filter corresponds to one of the jamming oscillator frequencies. Remotely controlled switches selectively remove band-pass filters from the circuit. For each channel that the subscriber is entitled to receive, the corresponding band-pass filter is switched out of the circuit so that the jamming signal corresponding to that frequency is not transmitted through the filter array. Those jamming frequencies that are transmitted through the filter array are combined with the video signals and transmitted on the subscriber line to the subscriber. Again, only those channels to which the subscriber is not entitled carry jamming signals to prevent his reception of premium signals on such premium channels.

These and other objects, features and benefits of the invention will be better understood from a consideration of the following detailed description taken in conjunction with the accompanying drawing.

BRIEF DESCRIPTION OF THE DRAWING

FIG. 4 is a schematic diagram of a video frequency combiner and power splitter that can be used in the embodiment of FIG. 3; and FIG. 5 is a schematic diagram of a distribution location that may be used in the system of FIG. 1 in accordance with still another embodiment of the invention.

DETAILED DESCRIPTION

Figure 1:
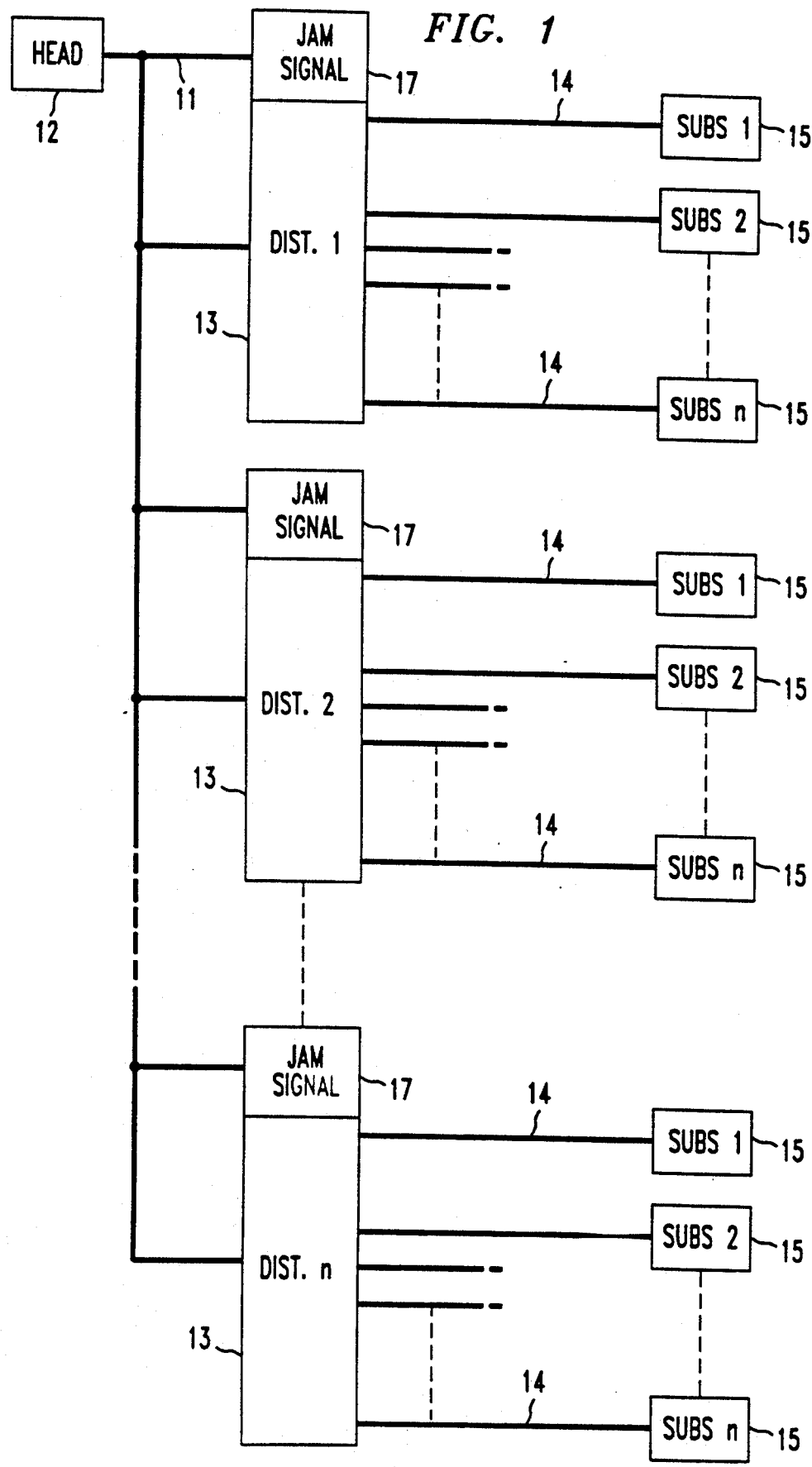
FIG. 1 is a schematic functional diagram of a CATV system in accordance with the invention.

The drawings and description are set forth primarily with a view to explaining the inventive concepts involved. With such understanding, those skilled in the art, in constructing CATV systems, will employ routine devices and circuitry which, in the interest of brevity and clarity, are not described in detail herein. Referring now to FIG. 1, there is shown, in accordance with an illustrative embodiment of the invention, a schematic functional diagram of a CATV system comprising a transmission line 11 connected at one end to head end apparatus 12 and at another end to a plurality of separate apparatus at distribution locations 13. Each distribution location is connected by a plurality of subscriber lines 14 to a plurality of subscriber location 15. The purpose of the system is to transmit video signals, each carrying a TV program over a plurality of TV channels of transmission lines 11 and 14 from the head end to the subscriber locations. Tuners at the subscriber locations permit selective reception by a TV set or TV receiver belonging to the subscriber. Since the invention does not require descrambling at the subscriber locations, the tuners may be those in the TV receivers at the subscriber locations.

In accordance with the invention, at each distribution location 13, jamming signals from sources 17 are applied to TV channels to prevent certain subscribers from receiving premium video signals on such channels. For example, if a subscriber, such as subscriber 2 of the first distribution location, is not entitled to receive a premium TV signal transmitted on channel 51, then a jamming signal of a frequency corresponding to TV channel 51 would be applied to the subscriber line 14 of subscriber 2 of distribution location 1. If subscriber 2 is entitled to receive premium video signals on other premium channels, then the jamming signals corresponding to such channels would not be applied to such subscriber line. The term "TV channel" means a frequency band of a transmission medium which is suitable for transmitting sufficient information to permit reconstruction of a video image and audio sound by a TV receiver without significant interference with other TV channels of such medium. The term "jamming signal" means any kind of signal used in a TV channel to prevent coherent reception of a video signal on such TV channel.

Figure 2:
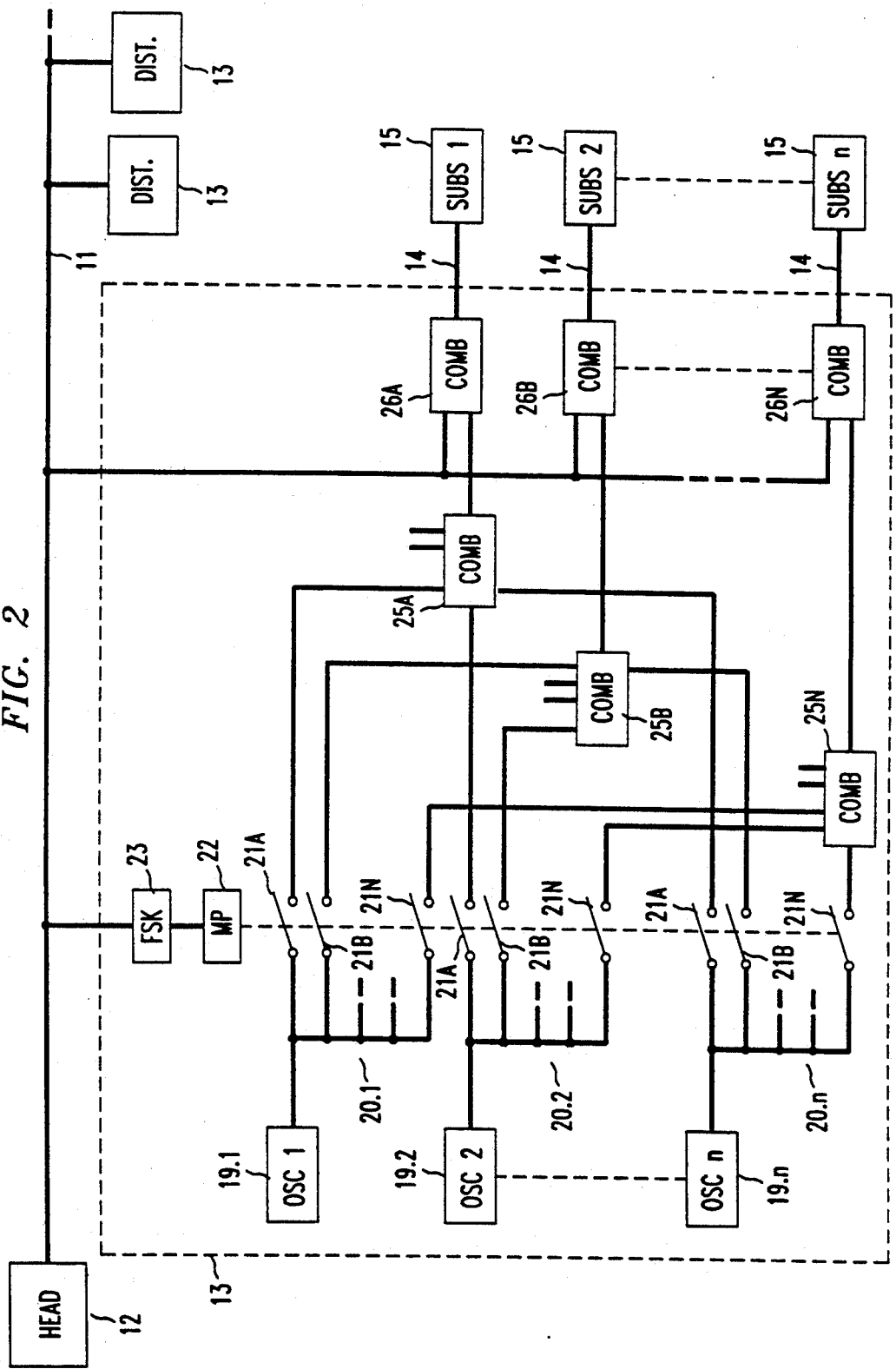
FIG. 2 is a schematic diagram showing a distribution location of the system of FIG. 1 in accordance with one embodiment of the invention.

A subscriber typically pays a monthly fee for the privilege of receiving an unjammed video signal on a premium TV channel. The system may also include one or more pay-per-view TV channels over which the subscriber may receive a single scheduled event such as a sporting event. Jamming signals from sources 17 are applied to the subscriber lines 14 carrying the pay-per-view channels which the corresponding subscribers are not entitled to receive. Whether the service provided is a continuous premium service or pay-per-view, the jamming signals are applied at the distribution locations 13 through switched networks controlled from the head end. FIGS. 2, 4 and 5 illustrate three illustrative methods by which the jamming signals can be controllably applied to selected premium TV channels of the various subscriber lines.

In the FIG. 2 embodiment, each distribution location 13 includes a plurality of oscillators $19.1-19.n$, each generating a continuous fixed jamming frequency corresponding to a premium video channel during the hours of operation of the CATV system. That is, if the CATV system were operated twenty-four hours a day, as is often the case, all of the oscillators $19.1-19.n$ would operate continuously around the clock. Further, if the CATV system has, for example, ten premium TV channels, each distribution location would include ten oscillators $19.1-19.n$, each generating a jamming signal sufficiently close in frequency to one of the premium video frequencies as to jam it or make it incoherent to a subscriber.

The output of each oscillator is connected to one of a plurality of switch arrays $20.1-20.n$, each of which comprises a plurality of parallel connected switches 21A-21N. (For convenience and brevity, array elements will sometimes be referred to by a single reference number; for example, switches 21A-21N will collectively be referred to as switches 21.) The number of switches 21 in each switch array 20 corresponds to the number of subscriber lines 14 serving subscribers at the subscriber locations 15. Thus, if one hundred subscribers are served from the distribution location 13, then each switch array 20 of that distribution location would comprise one hundred switches 21. For example, switches 21A of the different switch arrays all correspond to the subscriber designated Subs 1, switches 21B correspond to Subs 2 and switches 21N correspond to Subs n.

The switches 21 are controlled by a microprocessor 22 controlled from the head end 12. An address signal, for example, from the head end, designates which of the distribution locations 13 is to be accessed, and an FSK receiver 23 of the appropriate distribution location responds to the address signal to permit microprocessor 22 to be accessed. Frequency shift keying (FSK) receivers are well known for responding to selected address signals, although other devices could alternatively be used. The signal then programs the microprocessor to switch appropriate ones of the switches 21. For example, if the oscillator 19.1 generates the scrambling signal for premium TV channel 51, then all of the switches 21 (of array 20.1) corresponding to subscribers that are not entitled to receive that channel would be closed. Thus, if the subscriber 15 designated Subs 2 is not entitled to receive TV channel 51, then the second of the switches 21B of array 20.1 (connected to 19.1) would be closed. If the subscriber location designated Subs 1 is entitled to receive TV channel 51, then the switch 21A of array 20.1 connected to oscillator 19.1 would be left open.

The outputs of all of the common switches 21 are directed to a common radio frequency (RF) combiner 25; that is, all of the switches 21A are connected to RF combiner 25A, all of the switches 21B (corresponding to the second subscriber Subs 2) are connected to combiner 25B and all of the switches 21N (corresponding to Subs n) are connected to combiner 25N. The outputs of combiners 25A-25N are directed to combiners 26A-26N where they are combined with video signals from transmission line 11. Thus, all of the premium channels are transmitted on subscriber lines 14 to all of the subscribers, but jamming signals are transmitted on only those TV channels of subscriber lines to subscribers that are not entitled to receive such channels. There is therefore no need for de-scramblers at any of the subscriber locations.

Figure 3:
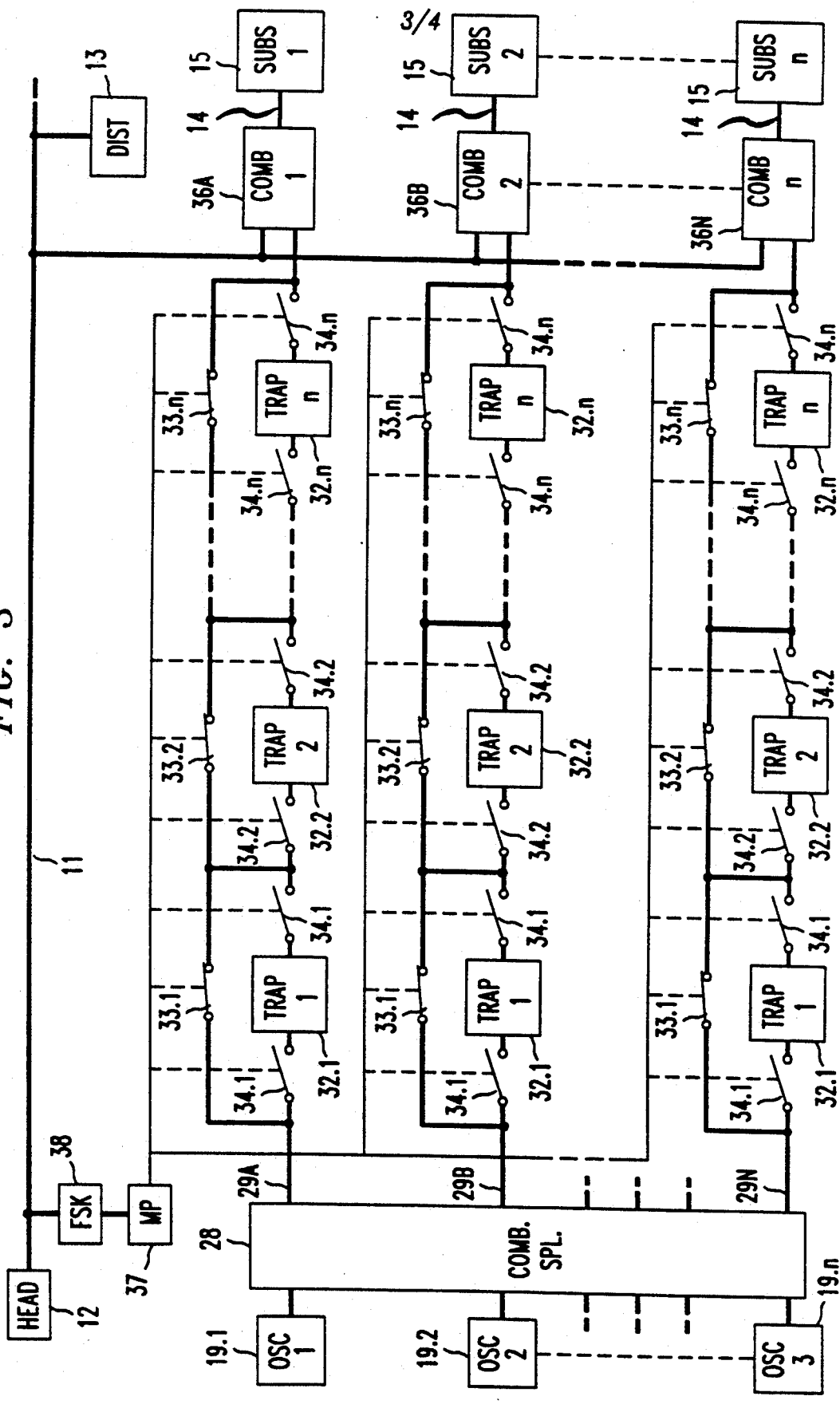
FIG. 3 is a schematic diagram of another distribution location that may be used in the system of FIG. 1 in accordance with another embodiment of the invention.

Referring now to FIG. 3, there is shown another embodiment in which, again, a plurality of oscillators 19.1-19.$n$ are used for generating jamming frequencies corresponding to the premium TV channels. The outputs of all of the oscillators 19 are combined in a combiner-power splitter 28. The combiner-power splitter combines all of the inputs of the oscillators and splits the outputs among a plurality of transmission lines 29A-29N. Referring to FIG. 4, the combiner-splitter 28 may be the equivalent of an RF combiner 30, which combines a plurality of inputs into a single output, and a power splitter 31, which splits a single input into a plurality of outputs, with the input power being divided substantially equally among the various outputs. All of the jamming frequencies at the input of splitter 31 are thereby included in each of its outputs. The number of output lines 29A-29N of combiner-splitter 28 is equal to the number of subscriber locations 15 to which the distribution location is connected.

Each of the lines 29A-29N is connected to a filter network comprising a series array of filter traps 32.1-32.$n$. Each of the filter traps is a band-stop filter having a frequency band corresponding to one of the jamming frequencies of oscillators 19.1-19.$n$. Each filter trap 32.1-32.$n$ is either connected in series or is bypassed by a switch 33.1-33.$n$. Each of the switches 33.1-33.$n$ is ganged to two switches 34.1-34.$n$ on opposite sides of the filter trap such that, when a switch 33 is closed, the corresponding switches 34 to which it is ganged is opened and vice versa. Thus, for example, when switch 33.1 of line 29A is closed, as shown, the two switches 34.1 of line 29A are opened. Each filter network is connected to a separate combiner 36A-36N. Each combiner combines the output of a filter network with video signals from transmission line 11 for transmission on such subscriber lines 14 to subscribers 15.

The switches 33 and 34 are controlled by a microprocessor 37 which, as before, is accessed through an FSK receiver 38 so as to be controlled from the head end 12. The microprocessor operates switches 33 and 34 to connect into the circuit for each subscriber a filter trap 32 corresponding to each premium channel frequency that the subscriber is allowed to receive. Other filter traps 32, which correspond to video frequencies to which the subscriber is not entitled, are bypassed by closed switches 33.

Consider, for example, the filter network of the first subscriber having an input line 29A and an output line connected to combiner 36A. Assume that he is allowed to receive the TV channel corresponding to oscillator 19.1, but not that frequency corresponding to oscillator 19.2. The microprocessor 37 would actuate switch 33.1 to be opened, whereupon switches 34.1 would be closed. This would cause the jamming signals to propagate through filter trap 32.1, which would trap, or filter out, the jamming signal corresponding to oscillator 19.1, but would leave other jamming frequencies intact. On the other hand, switch 33.2 would be operated to be closed, thus causing ganged switches 34.2 to be opened. As a consequence, the jamming signals from line 29A would bypass filter trap 32.2 and, thus, the jamming signal corresponding to oscillator 19.2 would remain on the line to be eventually combined in combiner 36A for transmission on subscriber line 14. This would jam the TV premium channel corresponding in frequency to oscillator 19.2.

The selective application of jamming signals to the subscriber line for subscriber 2 are controlled by the filter network connected to conductor 29B. It can be appreciated that with one filter network for each subscriber, selective application of jamming signals jams those premium channels to which each subscriber is not entitled and removes the jamming signal from TV channels to which such subscriber is entitled. This same system is used at each of the distribution locations 13 connected to transmission line 11.

Rather than having a series array of band-stop filters (or filter traps) for each subscriber line, one can use a parallel connected array of band-pass filters, as depicted in FIG. 5. For purposes of brevity and simplicity, FIG. 5 shows the filter network for only one subscriber of one of the distribution locations 13, it being understood that there is one such filter network for each of the other subscribers served by the distribution location. As before, oscillators 19.1-19.$n$ generate jamming signals corresponding to the premium TV channels, the jamming signals being combined in a combiner-power splitter 28, which has output lines 29A-29N corresponding to the different subscribers of the distribution location. The output 29A for subscriber 1 is connected through switches 40.1-40.$n$ to band-pass filters 41.1-41.$n$. As before, the switches 40.1 are operated through a microprocessor 44 controlled from the head end 12. The switches connected to opposite sides of each band-pass filter are ganged so that they move together; for example, switches 40.1 on opposite sides of band-pass filter 41.1 are either both open or both closed in response to the microprocessor.

In operation, the microprocessor 44 operates the switches 40 to connect into the circuit band-pass filters 41 having frequency bands corresponding to TV channels that are to be jammed or blocked. Those band-pass filters representing TV channels to which the subscriber is not entitled are switched to be connected to the circuit and those filters having frequencies corresponding to TV channels to which the subscriber is entitled are switched to be disconnected from the circuit. For example, if the subscriber 1 is entitled to receive the premium channel corresponding to oscillator 19.1 but is not entitled to receiver the channel corresponding to oscillator 19.2, the switches 40.1 would be open and switches 40.2 would be closed. As a consequence, the jamming signal corresponding to oscillator 19.1 would be blocked from transmission through the filter network while the jamming signal corresponding to oscillator 19.2 would be transmitted through closed switches 40.2 and band-pass filter 41.2 to a combining circuit 45. The pass band of filter 41.2 is sufficient to pass only the frequency of oscillator 19.2 and not the jamming frequencies of the other oscillators. Those jamming signals that are transmitted through the filter network are combined at combiner 45 and the output of combiner 45 is combined by a combiner 46 with all of the video signals of transmission line 11 for transmission to the first subscriber 15. It is believed that the foregoing is sufficient to demonstrate how jamming signals can be selectively applied to premium TV channels of a multiplicity of subscribers at each distribution location It can be appreciated that all three of the embodiments that have been described meet the objective of delivering premium CATV services to selected subscribers, which methods are reliable, relatively inexpensive, tamper-proof, and easy to install and to operate. In none of the embodiments is there propagation of a jamming or scrambling signal along with a video signal which a subscriber is entitled to receive, and therefore no need for de-scramblers at the subscriber location. In the embodiments of FIGS. 2 and 5, a single combiner, rather than two combiners, could be used for each subscriber line, but the use of separate combiners for accommodating the video signal, as shown, is preferred. In all of the embodiments, a separate fixed frequency, constantly operating oscillator 19 is used for each of the premium TV channels. The fact that no frequency changes are made during operation and that there are no oscillators being turned on and off makes this system relatively easier to operate and lends the system somewhat more reliability than systems that do require such operations on the oscillators or oscillator outputs. The embodiments described are intended to be merely illustrative of the inventive concept and other embodiments and modifications may be made by those skilled in the art without departing from the spirit and scope of the invention.

We claim:

1. A method for operating a CATV system comprising the steps of: transmitting video signals on a first transmission line from a head end to each of a plurality of distribution locations; transmitting the video signals on a plurality of second transmission lines from each of the distribution locations to each of a plurality of subscriber locations; each video signal being transmitted on a TV channel of the first and second transmission lines; certain ones of said video signals being premium signals which are each transmitted on a premium TV channel; determining which of the premium video signals each subscriber is entitled to receive; transmitting a jamming signal on those premium TV channels of each second transmission line which carry a premium video signal which a corresponding subscriber is not entitled to receive; and refraining from transmitting a jamming signal on those TV channels of the second transmission lines which carry a premium video signal which the corresponding subscriber is entitled to receive, different jamming signals being transmitted on different ones of said second transmission lines from each distribution location, thereby to permit different subscribers to receive different TV channels via each distribution location, the method characterized by the steps of:

generating at each distribution location a plurality of first jamming signals, each having a different frequency corresponding to a frequency of one of the premium channels;

providing remotely controlled switched networks at each distribution location:

directing the first jamming signals through the switched networks of each distribution location;

the transmission of the first jamming signals through the switched networks being independent of the video signals;

controlling the switched networks from the head end to prevent transmission therethrough of certain first jamming signals having frequencies corresponding to those premium video signals which certain subscribers are entitled to receive;

deriving from the switched networks second jamming signals containing frequencies corresponding to those first jamming signals allowed to be transmitted through such switched networks;

combining at each distribution location, independent of the video signal, those jamming signals to be transmitted to each subscriber;

and combining at each distribution location a second jamming signal derived from the switched networks with said video signals for transmission on each second transmission line to a subscriber location such that each subscriber coherently receives those premium video signals to which he is entitled, while those to which he is not entitled are jammed by said second jamming signal;

all of said second jamming signals transmitted to different subscribers from each distribution location being derived from said first jamming signals generated at such distribution location.

2. The method of claim 1 further characterized in that:

the step of transmitting video signals from the head end is done over a prescribed time period;

and during the entire time period the plurality of first jamming signals are continuously generated at the distribution locations.

3. The method of claim 1 further characterized in that:

the switching networks comprise a plurality of arrays of switches connected in parallel, each switch in each array being coupled to and corresponding to a different subscriber line;

at each distribution location, each first jamming signal is directed to a different one of the switch arrays;

each switch is remotely controlled from the head end to block first jamming signals of frequencies corresponding to video frequencies which the subscriber corresponding to such switch is entitled to receive;

and the combining step comprises combining the video signals with the outputs of switches that correspond to a common subscriber.

4. The method of claim 1 further characterized in that:

one switched network at each distribution location corresponds to each subscriber;

all of the jamming signals are directed through each switched network;

and filters are used in each switched network for removing first jamming signals corresponding to those premium video signals which a corresponding subscriber is entitled to receive.

5. A method for delivering from a head end of a CATV system to a plurality of subscribers a plurality of premium TV signals such that, during a prescribed time period of operation, each subscriber receives for his use only those premium TV signals to which he is entitled, said method comprising the steps of:

assigning to different subscribers various premium video frequencies corresponding to the different premium TV signals such subscribers are entitled to receive;

transmitting the premium TV signals as separate video frequencies to a plurality of distribution locations, each distribution location being connected by each of a plurality of subscriber lines to each of a plurality of subscriber locations;

applying at each distribution location different jamming signals to different subscriber lines connected to such distribution location comprising the step of generating at each of the distribution locations a plurality of first jamming signals of different frequencies, each first jamming signal having a substantially fixed frequency sufficiently near a corresponding video frequency to render a video signal at such frequency unreceivable by a subscriber, each first jamming signal being generated substantially continuously during the prescribed time period of operation;

combining the first jamming signals at each distribution location;

controlling from the head end the delivery of the first jamming signals to develop a second jamming signal that does not include frequencies corresponding to any premium TV signals that a corresponding subscriber is entitled to receive;

and combining each second jamming signal with all of the premium TV signals for transmission on each subscriber line to the subscriber locations such that the second jamming signal for each subscriber line jams only those premium TV signals to which the subscriber is not entitled, the adding being done at the distribution locations;

all of said second jamming signals transmitted to different subscribers from each distribution location being derived from said first jamming signals generated at such distribution location.

6. The method of claim 5 wherein:

the combined first jamming signals are delivered to each of a plurality of groups of controllable filter devices, each filter device group corresponding to one of the subscribers;

the controlling step comprises the step of controlling from the head end the frequencies that may be passed by each group of controllable filter devices;

using the filter device groups to derive from the combined first jamming signal only those jamming signals which correspond to video frequencies to which the subscriber corresponding to such filter group is not entitled to receive, thereby to develop the second jamming signal, said derivation being independent of the premium TV signals;

the adding step comprising the step of adding each second signal to the premium TV signal for transmission on a subscriber line.

7. The method of claim 6 wherein:

each group of filter devices comprises a plurality of band stop filters, each adapted to trap one of the separate jamming frequencies;

the controlling step comprises the step for controllably switching conductive paths that selectively bypass predetermined ones of the band stop filters;

and directing the combined first jamming signal successively through the band stop filters that have not been bypassed so as to develop the second jamming signal.

8. The method of claim 6 wherein:

each group of filter devices comprises a plurality of parallel connected band-pass filters, each constructed to pass only one of the first jamming frequencies;

the controlling step comprises controlling switches for selectively disconnecting only certain ones of the band-pass filters from the group of filter devices;

and directing the combined first jamming signal in parallel through only those band-pass filters that have not been disconnected to develop the second jamming signal that jams only those premium TV signals that the corresponding subscriber is not entitled to.

9. A CATV system comprising:

means comprising a first transmission line for transmitting video signals from a head end to each of a plurality of distribution locations;

means comprising a plurality of subscriber lines for transmitting the video signals from each of the distribution locations to each of the plurality of subscriber locations;

means at each distribution location for applying different jamming signals to different subscriber lines comprising means at each distribution location for generating a plurality of substantially continuous first jamming signals, each having a different frequency corresponding to the frequency of one of the video signals;

a plurality of remotely controlled switched networks at each distribution location;

means for directing the first jamming signals through the switched networks of each distribution location;

means for remotely controlling the switched networks from the head end to prevent transmission therethrough of certain first jamming signals having frequencies corresponding to those video signals which certain subscribers are entitled to receive, thereby to produce second jamming signals corresponding to those first jamming signals allowed to be transmitted through such switched networks;

first means for combining at each distribution location, independent of the video signals, jamming signals to be transmitted to each subscriber;

and second means for combining at each distribution location a second jamming signal derived from the switched networks with said video signals for transmission on each subscriber line to a subscriber location such that each subscriber coherently receives those video signals to which he is entitled, while those to which he is not entitled are jammed by said second jamming signal;

all of said second jamming signals transmitted to different subscribers from each distribution location being derived from said first jamming signals generated at such distribution location.

10. The system of claim 9 wherein:

the switched networks each comprise a plurality of arrays of switches in parallel, each switch array being coupled to and corresponding to a different subscriber line; and further comprising:

means at each distribution location for directing each of the first jamming signals to a different one of the switch arrays;

means for remotely controlling each switch from the head end to block first jamming signals of frequencies corresponding to video frequencies which the subscriber corresponding to such switch array is entitled to receive;

the first combining means comprises means for combining different first jamming signals, independent of the video signals, from different arrays of switches;

and the second combining means comprises means for combining the video signals with the outputs of a switch array corresponding to a common subscriber.

11. The system of claim 9 wherein:

one switched network at each distribution location is coupled to and corresponds to each subscriber;

the first combining means comprises means directly connected to all of the first jamming signal generating means for combining all of the first jamming signals and transmitting all of the first jamming signals to each switched network;

and each switched network contains filters for controlling transmission of first jamming signals.

12. The system of claim 11 wherein:

the filters are each filter traps for trapping one of the jamming signals;

the filters are connected in series in each switched network;

and the controlling means comprises remotely controlled switches for selectively bypassing certain ones of the filter traps such that only those first jamming signals that are bypassed from a filter trap constitute part of a second jamming signal.

13. The system of claim 10 wherein:

the filters are band-pass filters, each having a pass band corresponding to one of the jamming signal frequencies;

the band-pass filters are connected in each switched network in parallel;

and the controlling means comprises means for selectively disconnecting certain ones of the band-pass filters from the switched network such that only those first jamming signals transmitted through a filter constitute part of a second jamming signal.

14. A method for delivering from a head end of a CATV system to a plurality of subscribers a plurality of premium TV signals such that each subscriber receives for his use only those premium TV signals to which he is entitled, said method comprising the steps of:

transmitting the premium TV signals as separate video frequencies to a plurality of distribution locations, each distribution location being connected by each of a plurality of subscriber lines to each of the plurality of subscriber locations;

generating at each of the distribution locations a plurality of first jamming signals of different frequencies each corresponding in frequency to one of the separate video frequencies;

combining all of the first jamming signals at each distribution location, said combining being independent of any of the premium TV signals;

delivering the combined first jamming signals to each of a plurality of groups of controllable filter devices, each filter device group corresponding to one of the subscribers;

controlling from the head end the first jamming frequency that may be passed by each group of controllable filter devices;

using the filter devices to derive from the combined first jamming signals only those jamming signals which correspond to video frequencies to which the subscriber corresponding to such filter group is not entitled to receive, thereby to develop a second jamming signal;

and adding the second jamming signal to all of the premium TV signals for transmission on each subscriber line to the subscriber locations such that the second jamming signal for each subscriber line jams only those premium TV signals to which the subscriber is not entitled, the adding being done at the distribution locations;

different second jamming signals being applied to different subscriber lines at each distribution location;

all of said second jamming signals transmitted to different subscribers from each distribution location being derived from said first jamming signals generated at such distribution location.

* * * * *